N. E. RABER.
TIRE WRAPPING AND UNWRAPPING MACHINE.
APPLICATION FILED JULY 19, 1909.
958,309.
Patented May 17, 1910.
7 SHEETS—SHEET 2.
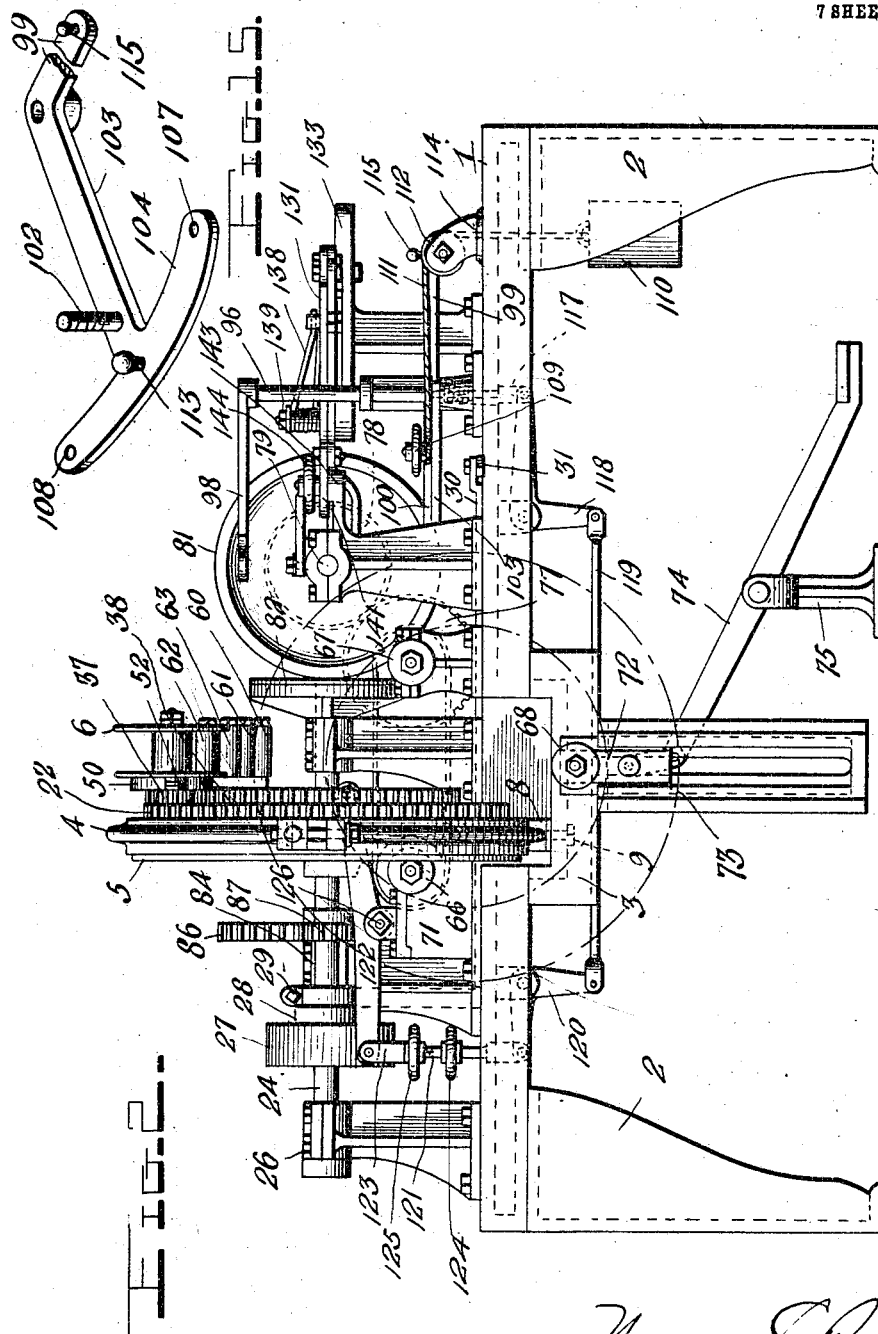

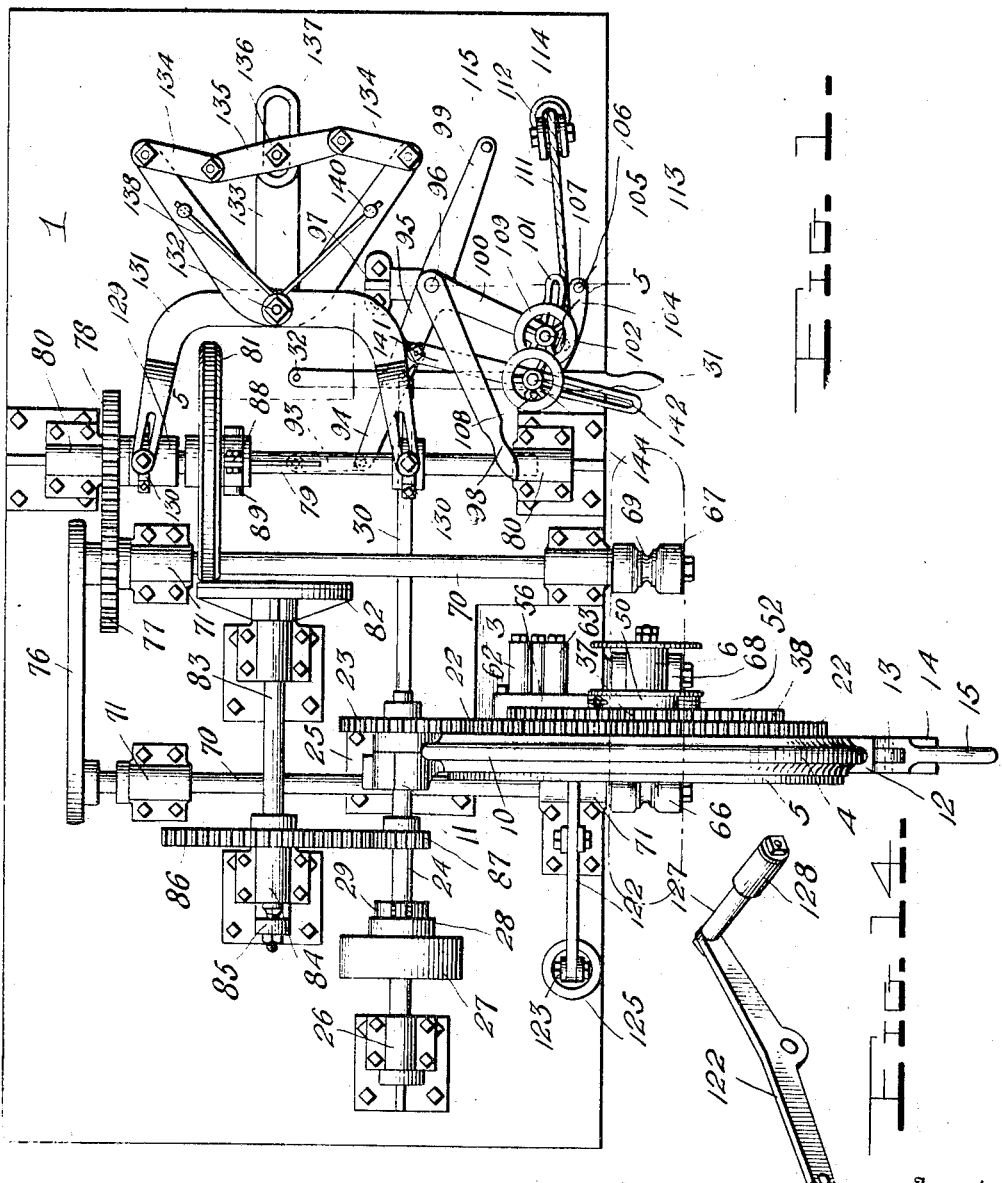

N. E. RABER.
TIRE WRAPPING AND UNWRAPPING MACHINE.
APPLICATION FILED JULY 19, 1909.
958,309.
Patented May 17, 1910.
7 SHEETS—SHEET 3.
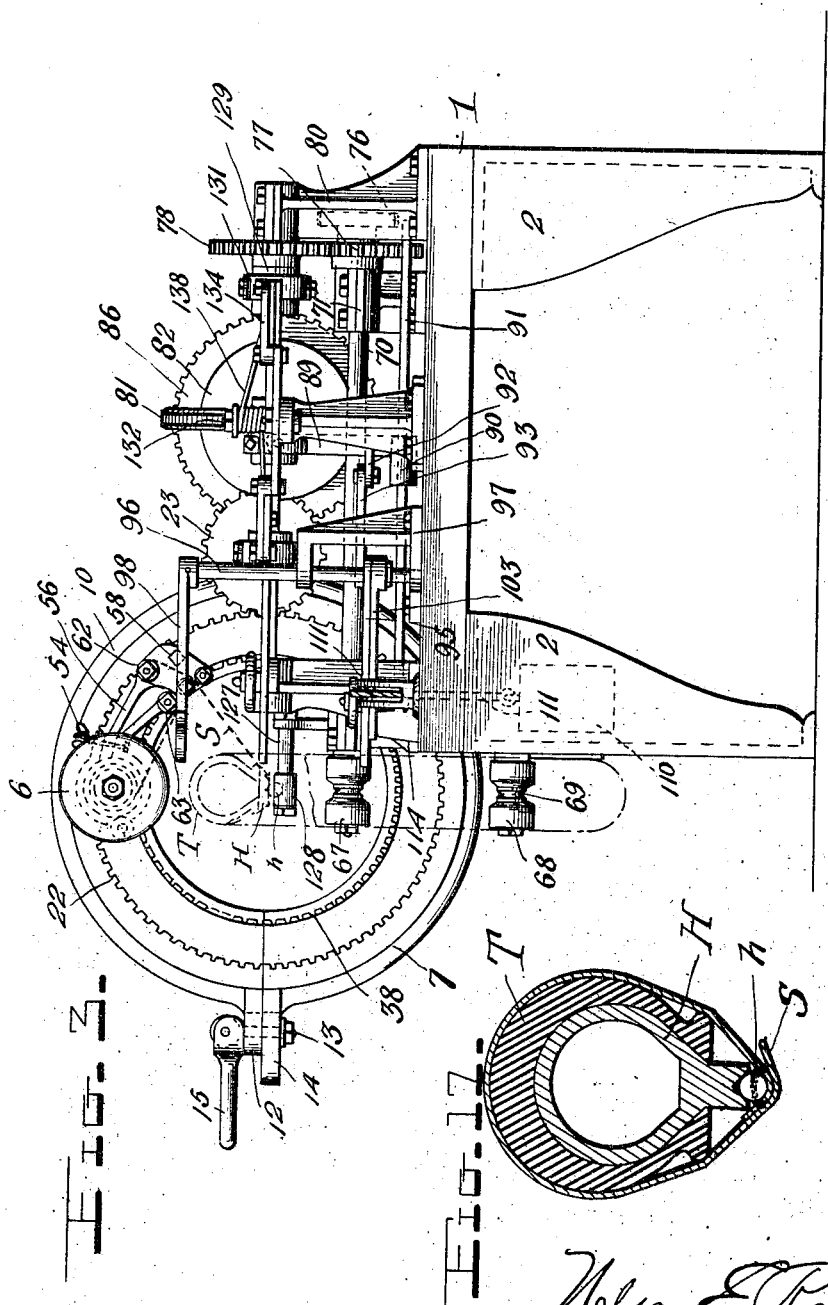
Witnesses
Chas. L. Griesbauer.
E. M. Rickette
Inventor
Nelson E. Raber
By Watson E. Coleman
Attorney

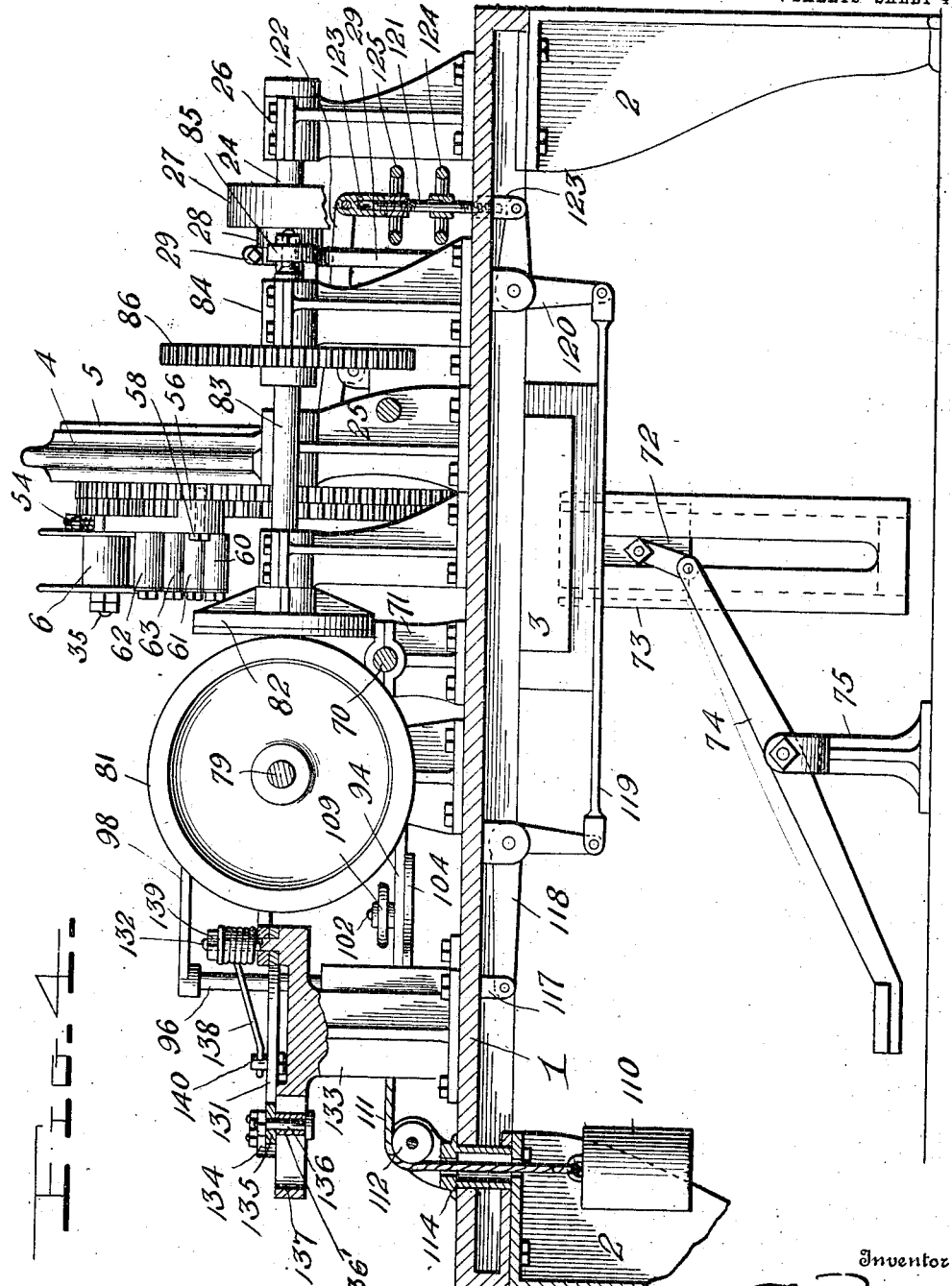

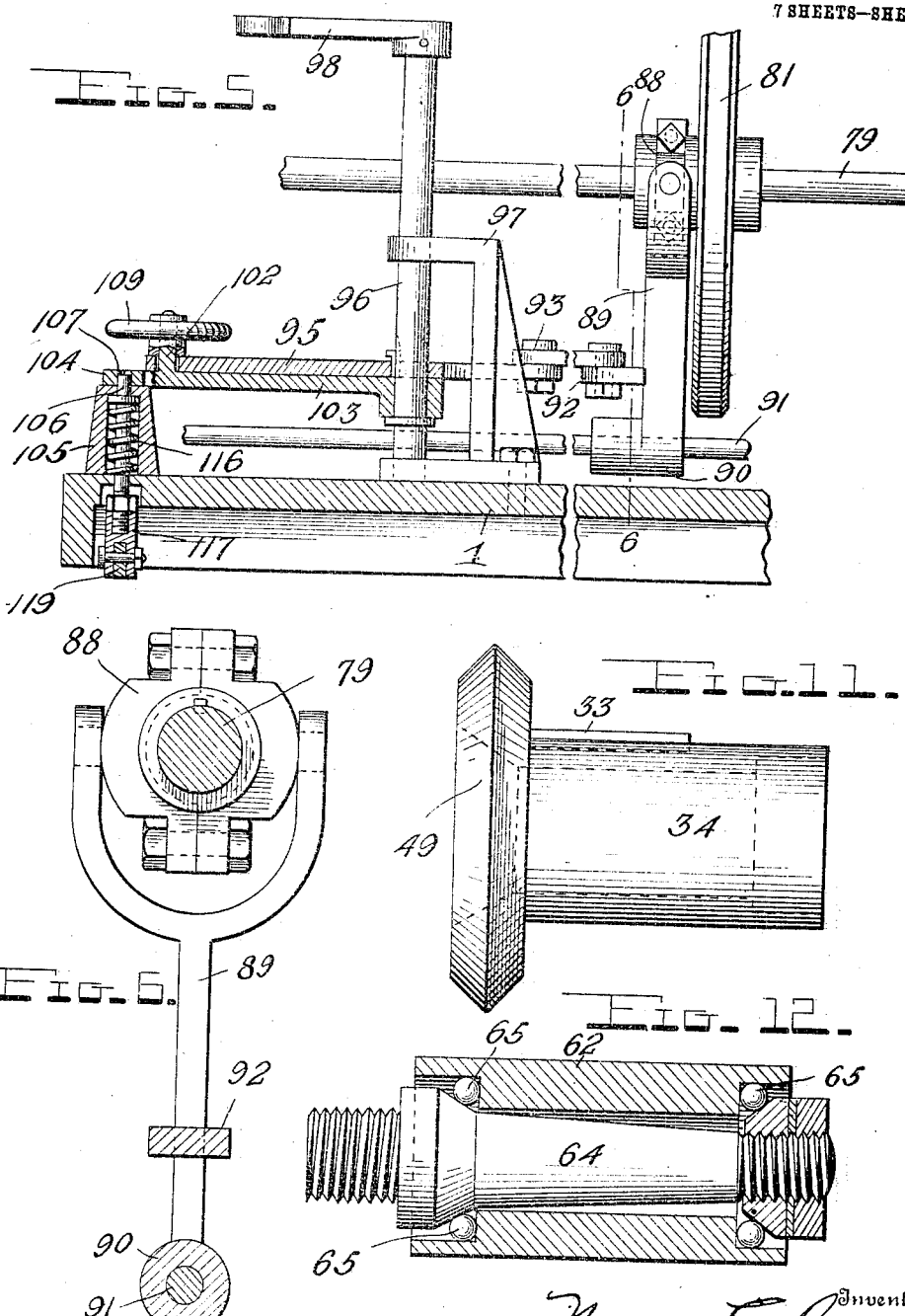

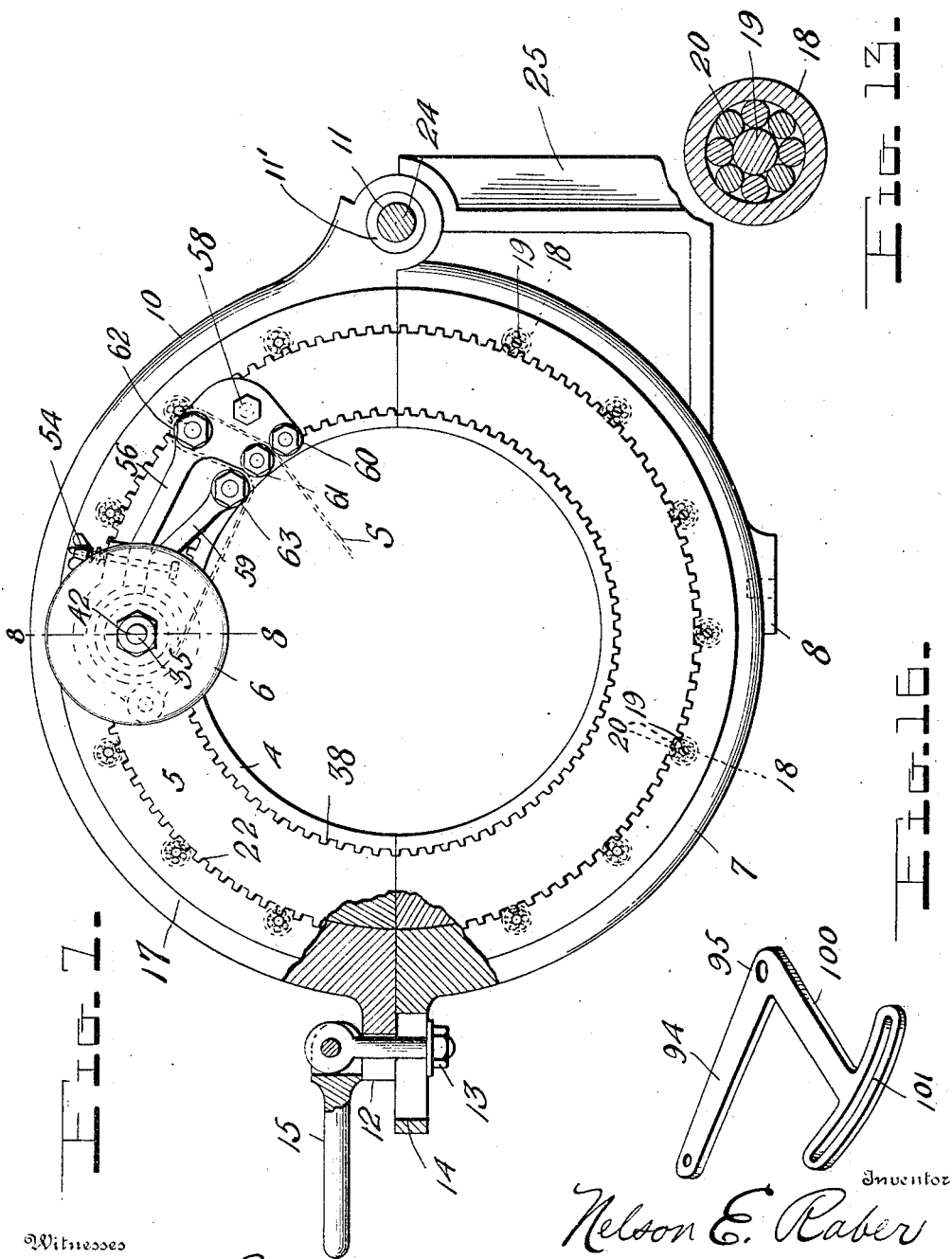

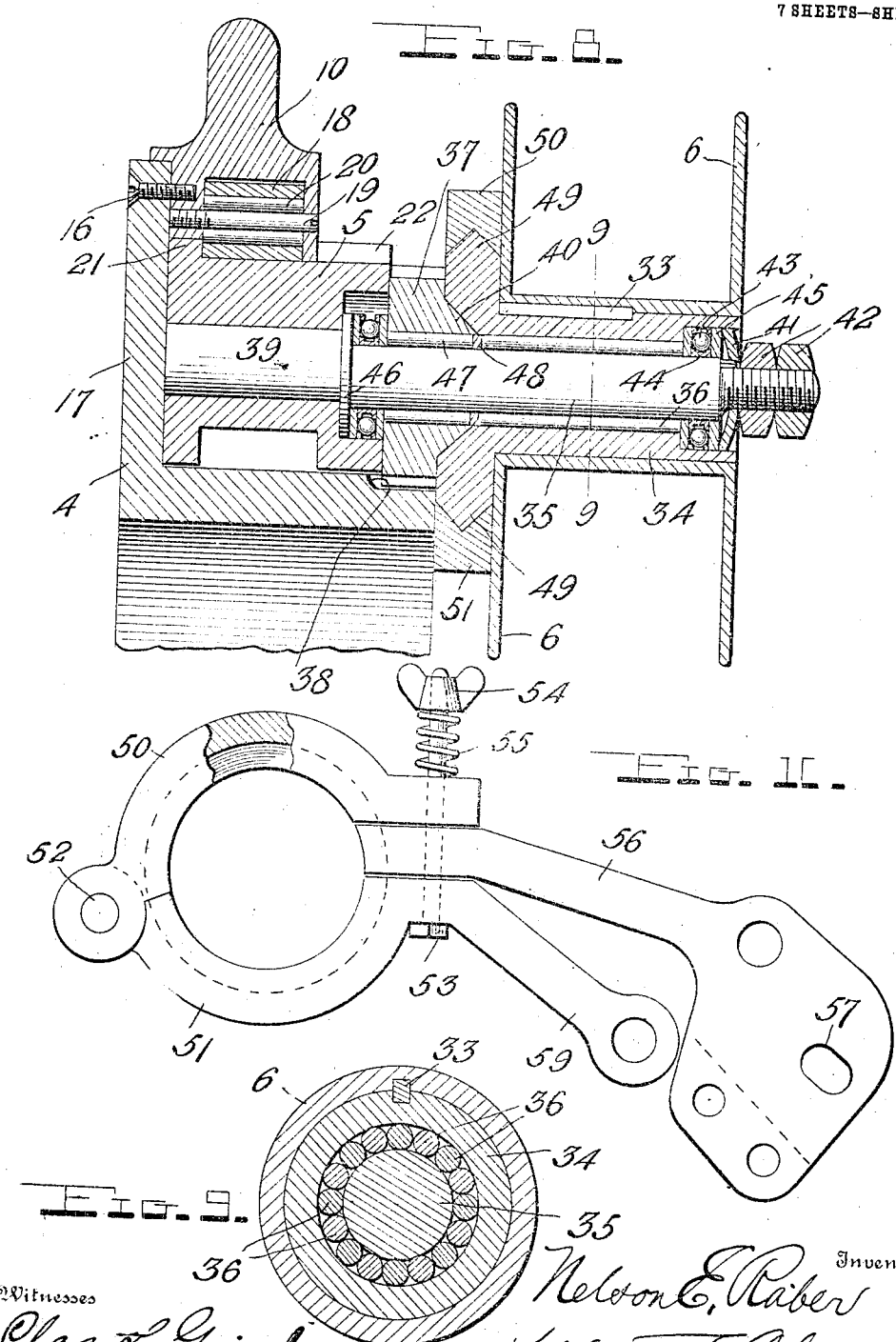

UNITED STATES PATENT OFFICE.

NELSON E. RABER, OF AKRON, OHIO.

TIRE WRAPPING AND UNWRAPPING MACHINE.

958,309.  Specification of Letters Patent.  Patented May 17, 1910.

Application filed July 19, 1909. Serial No. 508,462.

*To all whom it may concern:*

Be it known that I, NELSON E. RABER, a citizen of the United States, residing at Akron, in the county of Summit and State of Ohio, have invented certain new and useful Improvements in Tire Wrapping and Unwrapping Machines, of which the following is a specification, reference being had to the accompanying drawings.
This invention relates to improvements in machines for wrapping tires.

One object of the invention is to provide a simple and practical machine of this character which will be automatic in operation and which may also be used for unwrapping the tire after the vulcanizing process.

Another object of the invention is to provide an automatically operating machine of this character which will wrap the tape around the tire first in one direction and then in the reverse direction.

Further objects of the invention are to provide improved means for supporting the tire and rotating the same; improved means for mounting and operating the tape spool; improved means for controlling the speed of the tire rotating means; improved means for automatically reversing the tire rotating means and improved means for instantly stopping the tire rotating means.

With the above and other objects in view, as will hereinafter more fully appear, the invention consists in the combinations and arrangements of parts and in the novel features of construction hereinafter described and claimed, and illustrated in the accompanying drawings, in which—

Figure 1 is a plan view of my improved machine for wrapping and unwrapping tires; Fig. 2 is a front elevation of the same; Fig. 3 is an elevation of the right hand end of the machine; Fig. 4 is a detail view partly in longitudinal section and partly in elevation. Fig. 5 is a detail vertical transverse section. Fig. 6 is a detail section taken on the plane indicated by the line 6—6 in Fig. 5; Fig. 7 is a side elevation with parts broken away and in section, of the tape spool supporting and rotating means; Fig. 8 is a detail section taken on the plane indicated by the line 8—8 in Fig. 7; Fig. 9 is a detail section taken on the plane indicated by the line 9—9 in Fig. 8; Figs. 10 and 11 are detail views of parts of the tension device for the tape spool; Fig. 12 is a longitudinal section through one of the guide rollers for the tape; Fig. 13 is a detail sectional view through one of the anti-friction rollers for supporting the rotary annular spool carrying frame within the annular stationary supporting frame; Fig. 14 is a detail view of the trip lever; Figs. 15 and 16 are detail views of two of the levers forming part of the reversing and speed controlling mechanism for the tire rotating means; and Fig. 17 is a detail sectional view through the tire and its holder showing the trip projection to co-act with the trip lever.

In the preferred embodiment of the invention which is illustrated in the drawings 1 denotes a bed plate mounted in a horizontal plane upon supporting legs 2. The front portion of the bed plate is preferably formed with a downwardly offset portion 3 in which is secured a stationary annular frame 4 forming a support for a rotating annular frame 5 carrying a tape spool 6. The stationary frame or annulus 4 has the rotating frame or annulus 5 arranged within it and both of these frames are made in two half-sections which can be separated to permit a tire to be placed within them and upon a supporting and rotating means hereinafter described. The lower half-section 7 of the stationary frame 4 has upon its bottom a shoe 8 which is secured by a bolt 9 in the offset portion 3 of the frame, as will be understood on reference to Figs. 2 and 7 and the upper section 10 of said frame 4 has its rear end connected by a hinge 11 to the corresponding end of the section 7. The other or front end of the half-section 10 of the stationary frame has a lug 12 notched to receive a fastening bolt 13, which latter is slidably arranged in a slot formed in a lug 14 on the front end of the section 7 and carries a cam lever 15, as clearly shown in Fig. 7. The half-sections 7, 10 of the stationary frame are of angular shape in cross section, as shown in Fig. 8, and to the radially projecting flanges of said sections is secured by screws or similar fastenings 16, as shown in Fig. 8, a sectional ring 17. The ring 17 has two half-sections corresponding to the sections 7, 10 and arranged within it is an annular series of anti-friction rollers 18 which support and confine the rotary frame or annulus 5. The rollers 18, as shown more clearly in Fig. 13 of the drawings, are of cylindrical shape and arranged on pivot screws 19 with interposed annular rows of anti-friction cylinders 20.

The rotary frame or annulus 5 is formed of two half-sections to correspond with the half-sections of the stationary frame so that the tire can be inserted in and removed from said frame and it is provided with a shouldered portion or flange 21 which prevents lateral displacement. Provided upon the portion of the member 5 projecting from beneath the ring 17 is an annular series of gear teeth 22 forming a gear ring which meshes with a pinion or gear 23 fixed to a longitudinal shaft 24 on which is arranged a bushing 11′ to serve as a pintle for the hinge 11. The shaft 24 is journaled in bearing brackets 25, 26 rising from the bed plate and constitutes the main drive shaft of the machine. On this shaft is mounted a driving pulley 27 which is connected to the shaft by a suitable friction clutch conventionally illustrated at 28 controlled by a clutch lever 29. This lever is disposed vertically and has its lower end pivoted to the bed plate and its intermediate portion by a longitudinal link or rod 30 to the intermediate portion of a hand lever 31. This lever has its rear end pivoted at 32 upon the bed plate and upon its front end is a hand grip.

The tape spool 6 is keyed, as shown at 33, to a sleeve 34 rotatably mounted on a pivot 35 and having an annular row of anti-friction rollers 36, as shown in Figs. 8 and 9. Connected to the sleeve 34 by a safety friction clutch device is a pinion 37 which meshes with an annular row of gear teeth 38 provided upon one edge of the stationary frame 4 and forming a stationary gear about which the pinion 37 travels for the purpose of winding the tape upon the spool when the machine is used for unwrapping a tire. It will be understood that the pinion 37 is only in mesh with the gear ring 38 when the machine is used for unwrapping a tire and to permit this pinion to be thrown into and out of mesh with said gear 38, the pivot or shaft 35 is provided with an eccentrically disposed portion 39 rotatably arranged in the frame or annulus 5.

It will be seen on reference to Fig. 8 that when the end 39 of the pivot 35 is rotated the portion of said pivot carrying the pinion 37 will be shifted toward and from the frame 4 to throw the pinion 37 into and out of mesh with its gear. The above mentioned friction clutch connection between the pinion 37 and the spool carrying sleeve 34 is provided to prevent the tape from breaking and it preferably consists of forming upon the pinion 37 a concentric cone-shaped projection 40 which frictionally engages the wall of a cone-shaped recess in the adjacent end of the sleeve 34. A spring washer 41 is arranged between adjusting and jam nuts 42 on the reduced outer end of the pivot 35 and the outer end of the sleeve for securing the desired frictional contact of the cone 40 with the recess in which it is arranged. An annular row of bearing balls 43 arranged in a cage 44 are preferably provided between two washers 45 located beneath the spring 41 and in a concentric recess at the outer end of the sleeve 34. A similar arrangement of anti-friction balls and washers is provided between the pinion 37 and an annular stop flange 46 provided on the pivot adjacent its eccentric portion 39. I also preferably arrange within the pinion 37 an annular row of anti-friction rollers 47, which are spaced from the rollers 36 by a washer 48, as shown in Fig. 8 of the drawings.

The guiding and tension device for the tape spool 6 is shown more clearly in Figs. 7, 10 and 11 of the drawings and comprises an annular flange 49 provided on the sleeve 34 and having a V-shaped edge to enter similar-shaped recesses formed in the opposing faces of two substantially semi-circular tension brake members 50, 51. These members are pivoted together at one end, as shown at 52, and have their opposite ends formed with openings to receive a clamping bolt 53 provided with a winged adjusting nut 54 and a tension spring 55. The members 50, 51 are anchored by a bracket 56 having an apertured end to receive the bolt 53 and interposed between said members, as shown in Fig. 10. The other end of the bracket 56 has an elongated opening 57 to receive a screw 58 arranged upon the rotating frame or annulus 5. The opening or slot 57 allows the bracket 56 to shift when the pinion 37 is thrown into and out of mesh with the gear ring 38. It will be seen that by adjusting the nut 54 the tension of the brake members 50, 51 may be varied on the spool carrying sleeve 34. The bracket 56 and the bracket arm 59 formed on one end of the member 51 provide supports for the pivots of four rollers 60, 61, 62, 63 for the strip of tape, which latter is denoted by the letter S. These rollers are arranged, as shown in Fig. 7, and are preferably constructed and mounted substantially as shown in Fig. 12, on reference to which latter figure it will be seen that the pivot 64 for the rollers has a threaded end adapted to be screwed into one of the openings in the bracket 56 and arm 59. Anti-friction bearings 65 are also preferably provided for these rollers so that the tape will be permitted to run easily and will be kept free from grease which is placed within the rollers.

The tire which is indicated by the letter T is supported while being wrapped by a forming or holding device such as shown in Fig. 17 of the drawings. This holding device consists of a core H which is arranged within the tire T and has an inwardly projecting annular flange formed with a V-shaped groove. The strip of tape S has attached adjacent to one of its ends a substantially spherical button $h$ which is seated in the groove of said flange on the core. The tape S extends from the tire upwardly between the rollers 60, 61, around the roller 62, then downwardly around the roller 63 and from the latter to the spool or drum 6. The rollers 60, 61 serve as guides so that the machine can run in either direction for either the winding or unwinding operation. Owing to the manner in which the tape is engaged with the rollers 62, 63, and owing to the arrangement of the roller 63 on the bracket arm 59, which latter is in effect a lever, the pull upon the tape will be communicated to the friction brake device for the spool 6. This variable tension device is provided because less power is required to unwind the tape from the spool when the latter is full than when the spool is almost empty. It will be noted that the pull on the tape increases as the spool is gradually emptied and this increased pull will tend to open the friction brake or tension device, thereby maintaining a uniform tension on the tape.

The tire and its holder are supported on two supporting and driving rollers 66, 67 and are retained thereon by a retaining roller 68. These three rollers are of cylindrical form and have annular grooves of substantially V-shape in cross section to correspond to the cross sectional shape of the inner portion of the holder H and in the bottoms of said V-shaped grooves are smaller grooves 69 which allow for the free movement of the trip lug or button $h$ over said rollers. The supporting and driving rollers 66, 67 are fixed to the front ends of horizontal shafts 70 journaled in bearing brackets 71 on the bed plate, while the third roller 68 is journaled on a stub shaft projecting from a slide 72 having undercut or dove-tailed edges arranged for vertical movement in an upright guide 73 depending from the offset portion 3 at the front of the bed plate. Said slide 72 is connected by a link to a foot lever or treadle 74 pivoted intermediate its ends on a bracket 75 secured to the floor or support on which the machine is placed. It will be seen that when the free end of the foot lever 74 is depressed the slide 72 will be elevated so that the tire and its holder may be placed upon the three rollers, and that when said foot lever is released the weight of the slide 72 will draw the roller 68 downwardly and cause the same to make the tire holder H bear with sufficient friction on the driving rollers 66, 67, which latter are disposed in the same horizontal plane. It will be noted that this arrangement of the rollers allows tires of different sizes to be handled by the machine.

The two shafts 70 are connected together for simultaneous movement in the same direction by an endless belt 76 arranged on pulleys at their rear ends and on one of said shafts is fixed a gear 77 which meshes with a gear 78 fixed to a forwardly and rearwardly extending shaft 79 journaled in bearing brackets 80. Slidably but non-rotatably mounted on the shaft 79 is a friction wheel 81, the periphery of which engages and is shiftable across the face of a friction driving disk 82 fixed to one end of a longitudinally extending shaft 83 journaled in bearings 84, one of the latter having a thrust bearing 85 for the other end of the shaft 83, as shown in Fig. 1. The shaft 83 has fixed to it a gear 86 which meshes with a pinion 87 fixed to the main drive shaft 24.

The friction wheel 81 is shiftable across the face of the driving disk 82 for the purpose of varying the speed of the tire rotating rollers 66, 67 and also for reversing the direction of movement of the same. Said wheel 81 has its hub slidably arranged on the shaft 79 but keyed to the same for rotation therewith, and rotatably mounted in its hub portion is a sectional collar 88 pivoted in the forked upper end of a shifting member 89, the lower end of which latter has a guide sleeve 90 which is slidable on a guide rod 91 extending in a forward and rearward direction beneath the shaft 79 and having its ends supported in the brackets 80, as shown in Fig. 3. Upon the intermediate portion of the member or slide 89 is a lug 92 to which latter is pivoted one end of a link 93 having its other end pivoted to one arm 94 of an angular lever 95. The lever 95 has its angle fixed to a vertical pivot or shaft 96 rotatable in upper and lower bearings on a bracket 97 secured to the bed plate and on the extreme upper end of said shaft is fixed a hand lever 98 by means of which the lever 95 may be shifted. The second arm 100 of said lever projects forwardly and has at its extremity a transverse portion formed with an arc-shaped slot 101. The latter receives an upright screw stud 102 projecting from an arm 103 which is loosely mounted on the pivot or shaft 96 beneath the arm 100 and which has at its free or front end a transverse head 104 adapted to swing above the top of a guide casing 105 secured on the bed plate and containing a spring projected catch or dog 106. The latter is in the form of a vertically sliding pin, as clearly shown in Fig. 5 of the drawings, and its projecting upper end is adapted to enter either one of two openings or seats 107, 108 formed in the ends of the cross portion or head 104 of the arm 103. The catch or dog 106 is, therefore, adapted to lock the arm 103 in either of two positions and the arm 100 is adjustably connected to it by means of the screw stud 102 and a clamping nut 109 arranged upon the latter and in the form of a hand wheel, as clearly shown in Figs. 1 and 5 of the drawings.

It will be seen that when the lever 95 is shifted the friction wheel 81 will be shifted longitudinally on the shaft 79 and hence across the face of the driving disk 82 so that by tightening the nut 109 after the friction disk has been shifted to an adjusted position, it will be maintained in such position, thereby determining the speed of the driving rollers 66, 67 for the tire. The parts above described are also so proportioned that when a tire is to be wrapped the catch 106 engages the seat 107 at one end of the head 104 and the wheel 81 will be at or adjacent to one edge of the disk 82, according to the adjustment of said wheel, and that when a tire is to be unwrapped the catch 106 is engaged with the seat 108 in the other end of the head 104. The shifting movement of the head 104, when the catch 106 releases it, is preferably effected by providing a weight 110 on one end of a cord or other flexible element 111 which passes over a guide pulley 112 and has its other end detachably connected to a stud or button 113 arranged at the center of said head 104. The pulley 112 is journaled in a block 114 which has a swiveled connection with the bed plate, as shown in Fig. 4, and which has a tubular portion to receive the cord 111, thereby allowing the weight 110 to hang beneath the bed plate 1. The pulley block 114 is swiveled so that the cord 111 when detached from the pin 113 may be engaged with a similar pin or button 115 arranged in the aperture of an angularly projecting arm 99 provided on the pivoted end of the arm or member 103. The cord 111 is thus shifted when a tire is to be unwrapped, as will be hereinafter explained.

The catch pin or dog 106 is projected upwardly by a coil spring 116 arranged within its casing 105 and its lower end is adjustably connected, as shown at 117, to one arm of a bell crank 118 which is pivoted beneath the bed plate and has its other arm connected by a link 119 to the corresponding arm of a similar bell crank 120. The latter is also fulcrumed beneath the bed plate and has an arm connected by a link 121 to a trip lever 122. The link 121 is preferably made adjustable, as shown in Fig. 4, by making it of a rod having its ends formed with right and left hand screw threads which engage similar threaded socket members 123 pivoted to the bell crank 120 and lever 122. A hand wheel 124 is fixed to the link rod 121 and a lock nut 125 in the form of a hand wheel is arranged on the upper threaded end of the link rod and adapted to be screwed against the upper socket member 123 to retain the parts in adjusted position. The trip lever 122 is fulcrumed intermediate its ends at 126 on the part of one of the bearings 71, as shown in Figs. 1 and 2. Said trip lever extends longitudinally and its free arm is adapted to project into the open frames 4, 5 so as to be engaged and actuated by the trip projection or button $h$ on the tire holder H. To effect this latter result, said free end of the trip lever is provided with a forwardly extending stub shaft 127 on which is journaled a roller 128 which lies in the path of the trip button $h$ so that as the tire and its holder are rotated on the rollers 66, 67, 68 said button $h$ will strike the trip roller 128 to shift the trip lever 122, thereby causing the link and lever connections above described to retract the catch or dog 106.

For the purpose of quickly stopping the movement of the rollers 66, 67, I provide means for shifting the friction wheel 81 to the center of the driving disk 82, such means consisting of slidable sleeves 129 arranged on the shaft 79 on opposite sides of the wheel 81 and having annular grooves in which are arranged sectional collars 130. 131 denotes two angular levers having forked ends slotted, as shown in Fig. 1, for the reception of screws which are arranged in the sectional collars 130, washers being arranged on said screws, as shown. This construction provides a slot and pin connection between said parts and prevents the sleeves from rotating. These levers are crossed and are pivotally united at their point of intersection by a pivot 132 rising from a supporting bracket 133 on the bed plate. The opposite ends of said levers 131 are connected by links 134 to a cross bar 135 centrally pivoted on a bolt 136 which carries a roller 136' and is slidable in a slotted arm 137 of the bracket 133, as shown in Figs. 1 and 4 of the drawings. This link connection between said levers 131 is provided to cause them to have uniform movement when actuated by a spring 138 in the form of a wire having its central portion coiled and retained upon the pivot 132 by a nut 139 and which has its ends connected at 140 to said levers 131. Pivoted to a lug on the forked arm of one of the levers 131 is an adjusting link 141. The forward end of this link is longitudinally slotted to receive a screw stud 142 rising from a bracket 143 on the bracket 80. A clamping nut in the form of a hand wheel 144 is arranged on the upper end of the screw stud 142 to clamp the link 141 in adjusted position. It will be seen that when the nut 144 is loosened the slotted forward end of the link 141 may be shifted to adjust the sleeves 129 toward and from each other so that these sleeves may also be used as stops to limit the shifting movement of the friction wheel 81; and that when nuts 144 and 109 are loosened and the link 141 and arms 103 and 100 are released, the spring 138 will actuate the levers 131 to quickly bring the sleeves 129 together and thereby cause them to move the wheel 81 opposite the center of the disk 82 for the purpose of stopping the movement of the shaft 79.

In operation, when it is desired to wrap a tire which is to be vulcanized, the half-sections of the rotating frame 5 are brought into register with the half-sections of the stationary frame 4, the cam lever for the fastening bolt at the free ends of the frame sections 4 is then thrown up and said bolt moved outwardly to free the upper section 10, which latter together with the upper section of the rotating frame 5 may be raised upwardly to permit the tire to be placed within said frames, it being understood that the tire is placed in its holding device H. After the tire has been arranged upon the rollers 66, 67, 68 as above explained, the half-sections of the frame 4 are locked together and the free end of the strip of fabric or tape S on the spool 6, after being passed between the guide rollers, has the button h which it carries inserted in the groove of the core H. It will be understood that when the machine is used for winding or wrapping the tape on the tire, the pinion 37 will be out of mesh with the gear 38. With the tire and tape thus applied and the parts of the machine in the position shown in Figs. 1, 2 and 3, the lever 31 is shifted to actuate the clutch 28 and thereby lock the belt pulley 27 to the main drive shaft 24 so that the latter will be rotated and its motion will be imparted through the gears 23, 22 to the rotating frame or annulus 5. The latter moves the tape spool around the tire. The tape S is caused to be spirally wrapped on the tire by the rotary movement of the latter which it receives through the rollers 66, 67, it being understood that the main drive shaft 24 imparts its motion through the gears 87, 86 to the shaft of the friction disk 82 and that the movement of the latter is imparted to the wheel 81 and hence its shaft 79 which is geared to one of the roller carrying shafts 70. When the machine is thus started the wheel 81 will be at or adjacent to the far side of the disk 82, its speed being governed by its position on said disk and such position being determined by the adjustment of the lever 95 with respect to the arm 103. It will be noted that the cross portion or head 104 of the arm 103 has its opening 107 engaged by the catch 106 so that the weight 110 will be held elevated and cannot actuate the arm until the tires make one complete revolution and the trip button h actuates the trip lever 122 to cause the catch 106 to be retracted. When the latter happens the weight 110 causes the lever 95 to be shifted for the purpose of bringing the friction wheel 81 to the opposite side of the driving disk 82, thereby reversing the direction of movement of the tire so that the tire will be cross wrapped; it being noted that the tape spool continues to rotate in the same direction. After the tire has made its second complete revolution the nuts 109 and 144 are loosened to release the link 141 and arms 103 and 100, thereby allowing the spring actuated levers 131 to shift the sleeves 129 toward each other to quickly shift the wheel 81 to the center of the disk 82 to stop the rotation of the tire.

When it is desired to unwrap tape from the tire, the latter is placed in position on the rollers 66, 67, 68 and the free end of the tape is attached to the spool 6 by wrapping the tape one or more times around it or otherwise fastening the tape. The eccentrically mounted pivot for the spool 6 is then shifted to cause the pinion 37 to mesh with the gear ring 38. The lever 95 is shifted so that the catch 106 engages the opening or seat 108 in the head 104 of the arm 103 and the weight cord 111 is attached to the button 115 on the arm 99 of said arm 103. When the parts are thus adjusted the machine is set in motion by means of the lever 31 and the unwinding operation will by substantially the same as the winding operation with the exception that the spool 6 will be rotated to wind the tape thereon.

It will be noted that when the machine is used either for winding or unwinding, the catch 106 is in one of the two seats of the head 104 so that when the tire has made one complete revolution and the button h trips the lever 122 to cause the catch 106 to free the head 104, the weight 110 will swing said head and consequently shift the friction wheel 81 across the center of the friction disk but said catch will not enter the other seat or opening in the head 104. The weight 110 will hold the friction wheel 81 in its shifted position until the tire has made a second revolution in the opposite direction, whereupon the machine is manually stopped, as above explained.

While I have shown and described in detail the preferred embodiment of the invention, I wish it understood that I do not limit myself to the constructions and arrangements of parts set forth since various changes may be made within the spirit and scope of my invention.

Having thus described the invention what is claimed is:

1. In a machine of the character described, the combination of means for supporting and rotating a tire alternately in opposite directions and means for winding tape about the tire while the latter is being rotated, whereby the tire will be cross wrapped.

2. In a machine of the character described, the combination of means for supporting and rotating a tire alternately in opposite directions, means for winding tape about the tire while the latter is being rotated, whereby the tire will be cross wrapped, and means for varying the speed of the tire rotating means.

3. In a machine of the character described, the combination of means for supporting and rotating a tire alternately in opposite directions, means for winding tape about the tire while the latter is being rotated, whereby the tire will be cross wrapped, a single driving means from which both the wrapping means and the tire rotating means are driven and means for stopping the tire rotating means without interfering with the wrapping means.

4. In a machine of the character described, the combination of means for supporting a tire wrapped with tape and means for unwinding the tape from said tire.

5. In a machine of the character described, the combination of means for supporting a tire wrapped with tape, a tape spool, means for moving the same around the tire and means for rotating said spool when being thus moved around the tire to cause the tape to be wound thereon as it is unwrapped from the tire.

6. In a machine of the character described, the combination of means for supporting a tire wrapped with tape, a tape spool, a support for the same movable around the tire on said support and means for moving said tape spool support alternately in opposite directions and means for rotating the spool to wind the tape thereon as it is unwound from the tire.

7. In a machine of the character described, the combination of means for supporting and rotating a tire, a stationary annulus, a rotary annulus upon the stationary one, means for rotating the rotary annulus, a stationary gear upon the stationary annulus, a spool carried by the rotary annulus and a pinion operatively connected to the spool and in mesh with said stationary gear.

8. In a machine of the character described, the combination of means for supporting and rotating a tire, a stationary annulus, a rotary annulus upon the stationary one, means for rotating the rotary annulus, a stationary gear upon the stationary annulus, a spool carried by the rotary annulus, a pinion to mesh with said gear and operatively connected to said spool and means whereby said pinion may be moved into and out of mesh with said gear.

9. In a machine of the character described, the combination of means for supporting and rotating a tire, a stationary annulus, a rotary annulus upon the stationary one, means for rotating the rotary annulus, a stationary gear upon the stationary annulus, a spool carried by the rotary annulus, a pivot for said spool having an eccentrically arranged portion rotatably mounted in said rotary annulus, a pinion to mesh with said gear, and a friction clutch connection between said pinion and said spool.

10. In a machine of the character described, the combination of means for supporting and rotating a tire, a stationary annulus, a rotary annulus upon the stationary one, means for rotating the rotary annulus, a stationary gear upon the stationary annulus, a spool carried by the rotary annulus, a tension device for said spool, a pinion to mesh with said gear and operatively connected to said spool and means for moving said pinion into and out of mesh with said gear.

11. In a machine of the character described, the combination of a support, means for supporting and rotating a tire, a shaft journaled on said support, a stationary annulus having separable sections, one fixed to said support and the other hinged to said shaft, means for fastening the sections of the annulus together, a rotary sectional annulus within the stationary one, a gear ring upon the rotating annulus, a gear upon the shaft to mesh with said gear ring and a spool carried by said rotating annulus.

12. In a machine of the character described, the combination of means for supporting and rotating a tire, a stationary annulus, a rotary annulus therein, means for rotating said rotary annulus, a spool carried by said rotary annulus, means operatively connecting the stationary annulus and the spool and guide rollers for a tape carried by said rotary annulus.

13. In a machine of the character described, the combination of tire supporting and rotating means, means for reversing the direction of movement of the tire supporting and rotating means, a trip device for controlling said reversing means and means carried by the tire on said supporting and rotating means for actuating said trip device.

14. In a machine of the character described, the combination of tire supporting and rotating means, a variable speed and reversing gear for operating said tire supporting and rotating means, means for adjusting said gear to control the speed of the tire supporting and rotating means, a trip device for actuating said gear to reverse the direction of movement of the tire supporting and rotating means and means carried by the tire on said supporting and rotating means for actuating said trip device.

15. In a machine of the character described, the combination of tire supporting and driving rollers, a variable speed and reversing gear for driving one of said rollers including a driving friction disk and a driven friction wheel shiftable across the face of said disk, means for shifting said friction wheel, a catch for holding said shifting means in adjusted position, means for actuating said shifting means when released by said catch, a trip device for controlling said catch and means carried by the tire upon said supporting and driving rollers for actuating said trip device.

16. In a machine of the character described, the combination of tire wrapping means, tire supporting and driving rollers, a variable speed and reversing gear for one of said rollers, said gear consisting of a driving friction disk and a driven friction wheel shiftable across the face of said disk, means for shifting said wheel, a catch for holding said shifting means in adjusted position, means for actuating said shifting means when released from said catch, a trip device for controlling said catch and means carried by the tire on said supporting and driving rollers for controlling said trip device.

17. In a machine of the character described, the combination of tire wrapping means, tire supporting and rotating means, means for reversing the direction of movement of the tire on said supporting and rotating means, a trip device for controlling said reversing means and means carried by the tire on said supporting and rotating means for controlling said trip device.

18. In a machine of the character described, the combination of tire wrapping and unwrapping means, means for supporting and rotating a tire, a reversing gear for said tire supporting and rotating means, a shifting means for said reverse gear, a catch for holding said shifting means in adjusted position, means for actuating said shifting means when released by said catch, a trip device for controlling said catch and means carried by the tire upon said tire supporting and driving means for controlling said trip device.

19. In a machine of the character described, the combination of tire supporting and driving rollers, a variable speed and reversing gear operatively connected to one of said rollers and consisting of a driving friction disk and a driven friction wheel movable across the face of said disk, an angular lever having one arm operatively connected to said wheel for shifting the same, a second angular lever adjustably connected to the other arm of the first lever and having two arms, a weight, a guide, a flexible element connected to the weight and engaged with said guide, means for connecting said element to either of the two arms of said second lever, a catch for holding said second lever in adjusted position, a trip device for controlling said catch and means carried by the tire on said supporting and driving rollers for actuating said trip device.

20. In a machine of the character described, the combination of tire supporting and driving rollers, a variable speed and reversing gear operatively connected to one of said rollers and consisting of a driving friction disk and a driven friction wheel movable across the face of said disk, a shifting lever for said wheel, an arm pivoted concentrically with said lever and having a head provided with spaced seats, an adjustable connection between said arm and lever, a catch to engage either of the seats in said head, means for shifting said arm and lever when the head is released by the catch, a trip device for controlling said catch and means carried by the tire upon said supporting and driving rollers for actuating said trip device.

21. In a machine of the character described, the combination of tire supporting and driving rollers, a variable speed and reversing gear operatively connected to one of said rollers and consisting of a driving friction disk and a driven friction wheel movable across the face of said disk, means for shifting said wheel, a trip device for controlling said shifting means, means carried by the tire on said supporting and driving rollers for actuating said trip device and means for shifting said wheel to the center of said friction disk.

22. In a machine of the character described, the combination of tire supporting and driving rollers, a variable speed and reversing gear operatively connected to one of said rollers and consisting of a driving friction disk and a driven friction wheel movable across the face of said disk, means for shifting said wheel, a trip device for controlling said shifting means, means carried by the tire on said supporting and driving rollers for actuating said trip device, a pair of spring pressed levers for shifting said wheel to the center of said disk and means for holding said levers in retracted position.

In testimony whereof I hereunto affix my signature in the presence of two witnesses.

NELSON E. RABER.

Witnesses:
HARRY E. KOEPGE,
ANNA BERNARD.